No. 849,459. PATENTED APR. 9, 1907.
W. T. CARTER & D. S. BEEBE.
METHOD AND MEANS FOR THE MANUFACTURE OF WIRE GLASS.
APPLICATION FILED NOV. 23, 1906.
2 SHEETS—SHEET 2.
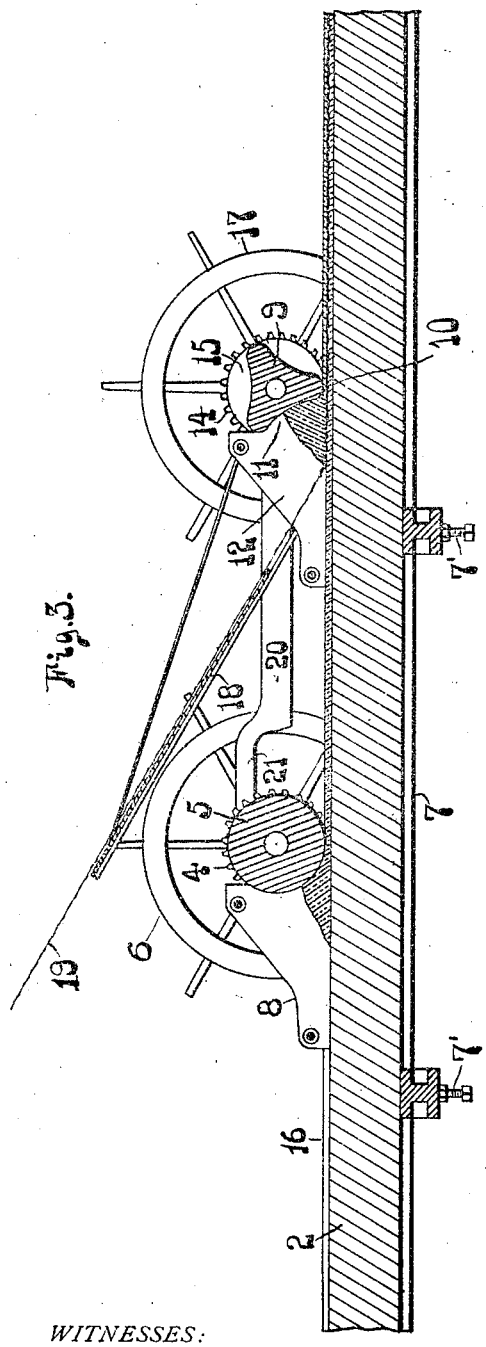
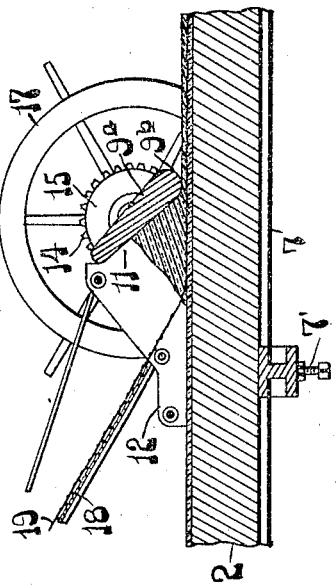
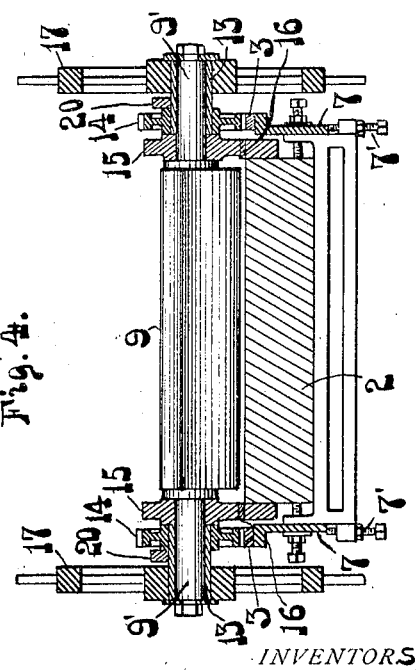
WITNESSES: INVENTORS,

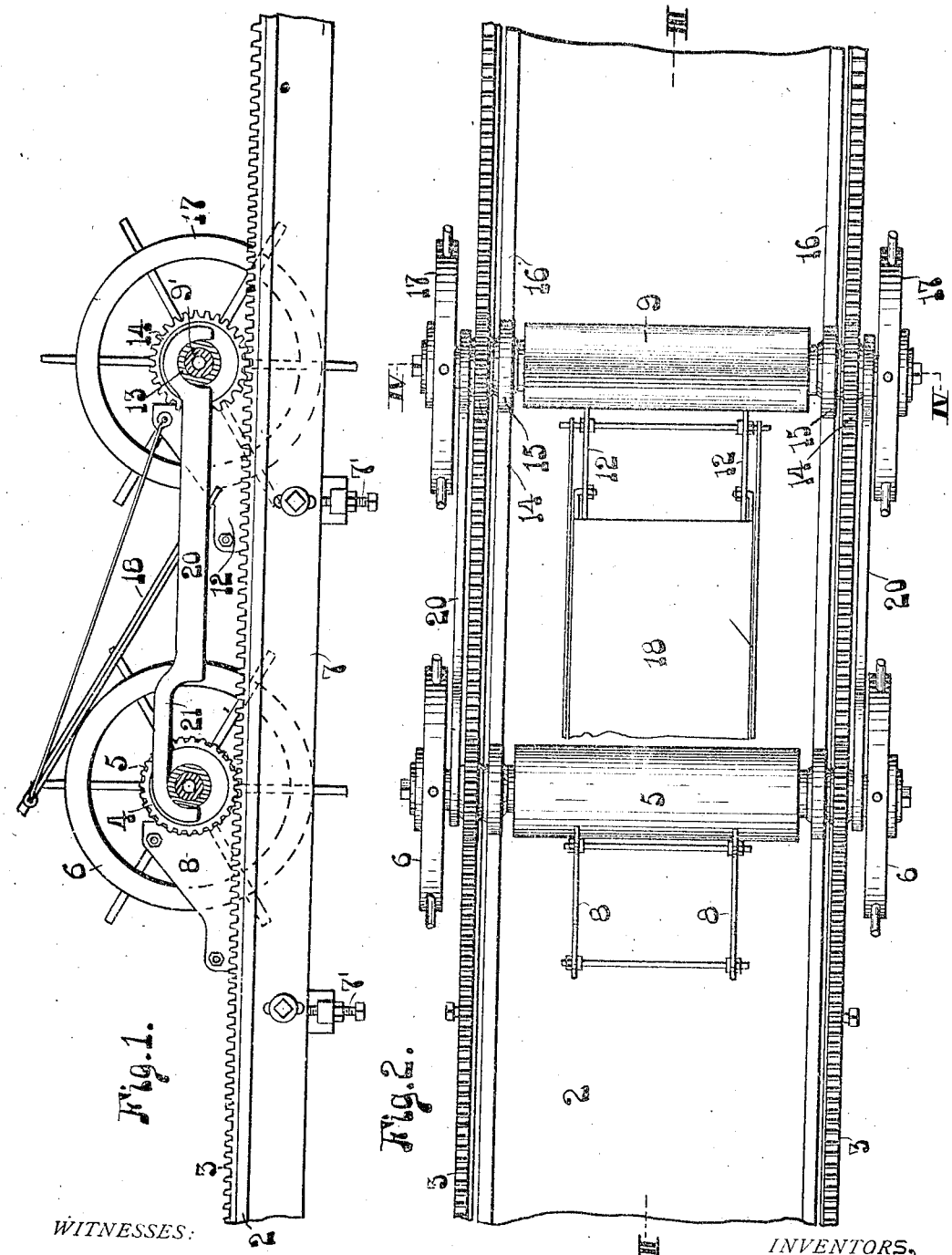

UNITED STATES PATENT OFFICE.

WALTER T. CARTER AND DANIEL S. BEEBE, OF BEAVER, PENNSYLVANIA.

METHOD AND MEANS FOR THE MANUFACTURE OF WIRE-GLASS.

No. 849,459.　　　　Specification of Letters Patent.　　　　Patented April 9, 1907.

Application filed November 23, 1906. Serial No. 344,711.

*To all whom it may concern:*

Be it known that we, WALTER T. CARTER and DANIEL S. BEEBE, citizens of the United States, residents of Beaver, in the county of Beaver and State of Pennsylvania, have invented or discovered a new and useful Method and Means for the Manufacture of Wire-Glass, of which the following is a full, clear, and exact description, reference being had to the accompanying drawings, forming part of this specification, in which—

Figure 1 is a side view and partly in section of the apparatus employed with the table partly broken away. Fig. 2 is a plan view of the same. Fig. 3 is a longitudinal section on the line III III of Fig. 2, but showing the glass on the table. Fig. 4 is a transverse section on the line IV IV of Fig. 2 with the forming-tool in elevation, and Fig. 5 is a detail view showing a modification.

The object of our invention, generally stated, is to produce wire-glass by forming two layers or sheets and embedding a wire trellis between them during the forming of the second layer.

It further consists in pouring a batch of molten glass upon a table, and preferably rolling a portion thereof into sheet form, then placing one end of a wire trellis on the partly-formed sheet, then pouring a second batch on the wire and sheet, then by advancing a scraper into engagement with the batch (which scraper has a portion of its side, the part that comes in contact with the batch, at substantially an acute angle to the sheet to be formed) the portion of the batch that is above the lower edge of the scraper is forced forward and downward, thus covering the trellis with glass in advance of the scraper and through the meshes of the trellis covering the partly-formed sheet. The scraper also in its forward movement exerts a downward pressure on that portion of the batch which is in close proximity to its forming edge, so that as it passes over the batch the batch is compressed, thereby completely filling the meshes of the trellis and compacting the partly-rolled sheet, trellis, and batch into an integral sheet.

Our invention also consists in several features of construction, arrangement, and combination, all substantially as hereinafter described, and pointed out in the appended claims.

In the accompanying drawings the numeral 2 designates the ordinary table, such as is commonly employed, having at its sides the longitudinal racks 3, which engage the teeth of pinions 4 on the end portions of the shaft of the forming-roll 5. This roll-shaft is provided at its ends with the usual hand-wheels 6. The racks 3 are preferably mounted in guides 7, in which they may be moved vertically by means of adjusting-screws 7' for the purpose of varying the distance between the roller 5 and the upper surface of the table 2, according to the thickness of the glass sheet or layer to be formed.

8 designates the usual shoes or guides, which fix the width of the sheet and which are pushed ahead by the roll.

9 designates a scraper, which in the arrangement shown is located at the rear of the roller 5 and which is used to form the second or upper layer of glass. This scraper may be of various forms; but it consists, preferably, of a transversely-extending bar having a convex spreading edge 10. In the form shown in Fig. 3 this bar is shown as having three convex spreading portions 10, any one of which may be used, so that if the glass sticks or burns to one of them it may be readily turned to bring another into position for use. The scraper is normally prevented from turning by means of the extensions 11 of the shoes or guides 12, which precede the scraper. The scraper pushes the shoes or guides 12 ahead of it.

The scraper 9 is formed at each end with projecting shaft or spindle portions 9', and upon each of these is loosely mounted a sleeve 13, carrying a pinion 14, whose teeth engage the racks 3. Loosely mounted on each of the shaft or spindle portions 9' is also a wheel 15, which is arranged to travel on a strip 16 at the edge of the table just inside of the rack 3. This strip may be adjusted vertically, or it may be removed and one of different thickness used to compensate the vertical adjustment of the racks 3.

17 designates hand-wheels, which are mounted on the sleeves 13 and which are preferably used for the purpose of moving the scraper and for applying the necessary pressure thereto.

18 designates a chute or trough through which the wire is fed upon the table in advance of the scraper, as indicated in Fig. 3.

19 indicates the wire, which is fed to the table intermediate the roller and scraper through the chute 18.

In the modification shown in Fig. 5 the scraper consists of a flat strip or bar 9ª, having a convex spreading edge 9ᵇ. This scraper is mounted and actuated in the same manner as the scraper shown in the other figures.

The roller and scraper are connected at each side by means of longitudinal bars 20, which rest upon and engage the respective shafts or spindles of the roller and scraper. The forward ends of these bars are formed with elongated cut-away portions or recesses 21 for engagement with the spindles of the roller in order to permit a limited movement of the roller before its forward motion will be transmitted to the scraper through said bars.

The operation is as follows: A batch of glass is placed upon the table in front of the roller 5. The roller is then actuated to roll down and spread, preferably, a portion of the first batch into a sheet. The end of a wire trellis 19 is then placed on the partly-rolled sheet. A second batch is then placed on or in close proximity to the end of the partly-formed sheet, so as to cover the end of the trellis, and as soon as the spindles of the roll engage the forward wheels of the recesses 21 the scraper 9 also moves forwardly and its side, which is at substantially an acute angle, engages the batch, compressing it, so that it gradually passes under the scraper, the lower edge of which scrapes it into an even and smooth surface layer, which is firmly united to the lower sheet or layer upon the embedded intermediate wire. The lost movement which is provided by reason of the recesses 21 enables the operator to insert the wire and the second batch of glass after the formation of the first sheet or layer has commenced and before the scraper commences to operate. Instead of the second batch being placed after the first sheet has been partly formed it can be placed on the table before the initial forming of the first sheet.

If desired, the roll and scraper may be disconnected and separately operated, the first sheet or layer being completely formed before the formation of the second one is commenced.

If desired, the roll and scraper or either of them may be cooled by circulating a cooling medium therethrough.

Various changes may be made in the details of construction and arrangement without departing from the spirit and scope of our invention, the salient feature of which in the apparatus consists in the use of a scraper for forming the upper sheet or layer.

What we claim is—

1. The method herein described of making glass plates, consisting in rolling the first sheet from a batch of molten glass, pouring a second batch of molten glass and scraping it into sheet form upon the first sheet.

2. The method herein described of making glass plates consisting in rolling an initial portion of the first sheet from a batch of molten glass, pouring a second batch of molten glass, continuing the rolling of the first sheet and scraping the second batch of molten glass into sheet form upon the first sheet.

3. The method herein described of making glass plates consisting in rolling the first sheet from a batch of molten glass, placing a portion of a metallic trellis thereon, pouring a second batch of molten glass and scraping it into sheet form upon the trellis and the first-formed sheet.

4. The method herein described of making glass plates consisting in rolling an initial portion of the first sheet from a batch of molten glass, placing a portion of a metallic trellis thereon, pouring a second batch of molten glass, continuing the rolling of the first sheet and scraping the second batch of molten glass into sheet form upon the trellis and rolled sheet.

5. The method herein described of making glass plates consisting in pouring a batch of molten glass upon a table in front of a roll, placing a wire trellis behind the roll and in front of a scraper, pouring a second batch of glass on the end of the trellis and by advancing the roll and scraper, rolling the first batch into a sheet and scraping the second batch into a sheet upon the first sheet with the trellis embedded between the sheets.

6. The method herein described of making glass plates, which consists in rolling a molten batch of glass into a sheet and during the rolling thereof scraping a second batch of molten glass into a sheet on the rolled sheet and simultaneously embedding the wire trellis between said sheets.

7. In combination, a table, means for forming a layer of glass thereon and a scraper adapted to scrape a second layer on the first layer, said scraper being inclined downwardly so as to recede from said roll for the purpose described.

8. In combination, a table, a roll adapted to form a layer of glass thereon and a scraper, said scraper inclining toward the top of said roll and adapted to scrape a second layer of glass on the first layer and embed a wire trellis between said layers.

9. In combination, a forming-roll, a scraper inclined toward the top of said roll and a lost-motion connection between the roll and scraper; substantially as described.

10. In combination, a forming-roll, a scraper inclined toward the top of said roll, means for feeding wire and glass intermediate the roll and scraper and bars engaging the shafts or spindles of both the roll and the scraper, whereby the roll has a limited movement independently of the scraper; substantially as described.

11. In the manufacture of glass plates, a scraping device having a plurality of scraping portions and means whereby said device may move to bring any one of said portions into position for use; substantially as described.

12. In the manufacture of glass plates, the combination with a table having side racks and side bearing-strips, a forming-roll having pinions engaging the racks, a scraper having loose pinions also engaging the racks and wheels traveling on said side strips and connections between the roll and scraper; substantially as described.

In testimony whereof we have signed our names to this specification in the presence of two subscribing witnesses.

WALTER T. CARTER.
DANIEL S. BEEBE.

Witnesses:
GEO. R. BOVARD,
KATHRYN P. CARTER.